Nov. 30, 1965   J. E. BRELSFORD ETAL   3,220,402
DRYER
Filed Feb. 26, 1964
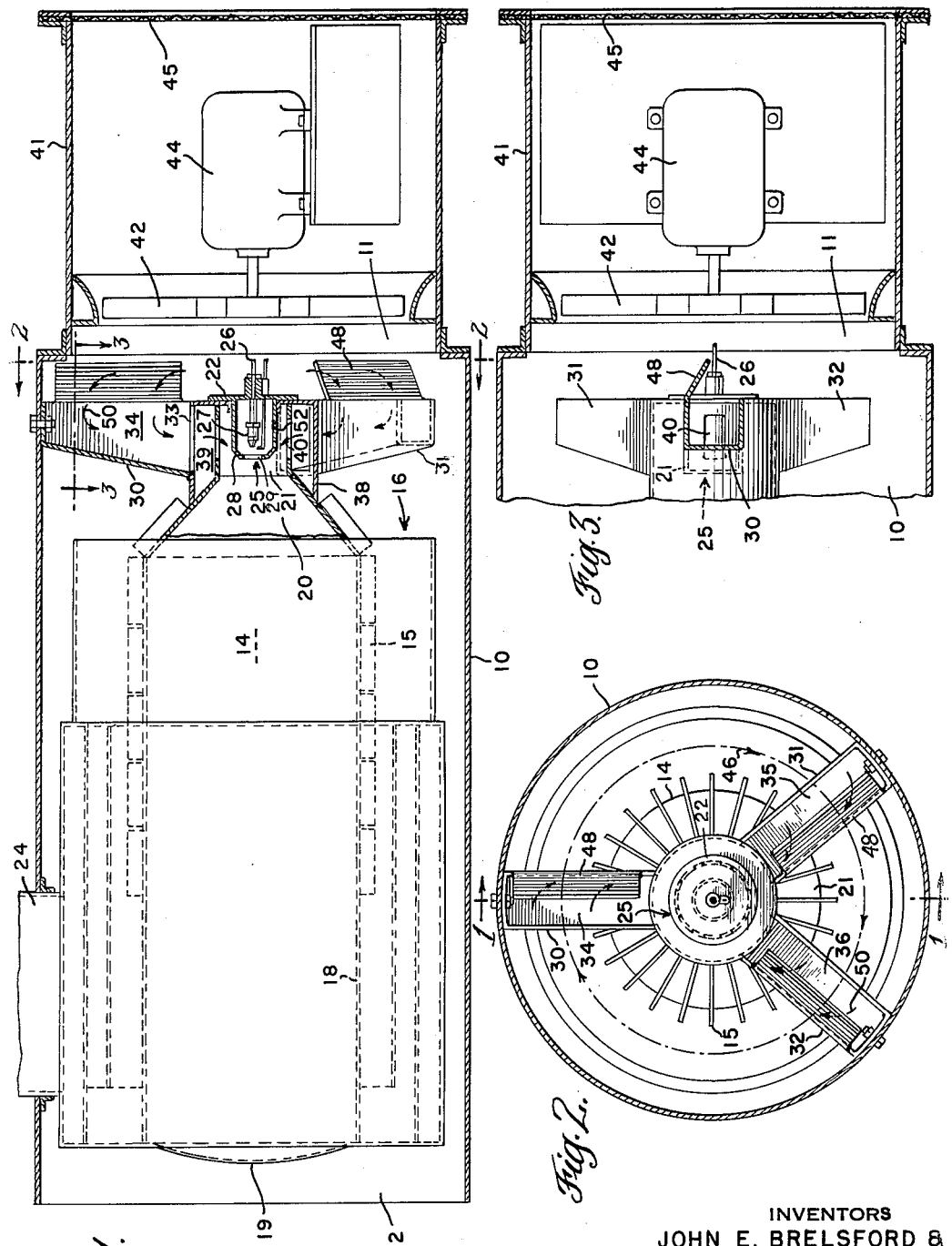
INVENTORS
JOHN E. BRELSFORD &
ALLISON W. BLANSHINE
BY Joseph A. Brown
ATTORNEY

United States Patent Office 3,220,402
Patented Nov. 30, 1965

3,220,402
DRYER
John E. Brelsford, Terre Hill, and Allison W. Blanshine, Lititz, Pa., assignors to Sperry Rand Corporation, New Holland, Pa., a corporation of Delaware
Filed Feb. 26, 1964, Ser. No. 347,475
3 Claims. (Cl. 126—110)

This invention relates generally to heating apparatus and more particularly to an improved crop dryer.

Heretofore, a crop dryer has been provided having a cylindrical chamber open at both ends. At one end, a large fan is mounted and operative to draw air into the dryer and blow it through the chamber. A burner unit is coaxially disposed in the dryer adjacent the fan. The air stream coming from the fan becomes heated as it passes by the burner unit. The heated air is discharged through the opposite end of the chamber and is suitably guided to pass through the crop to be dried.

In drying crop material it is important to have substantially complete combustion for fuel economy and resulting low cost operation. To achieve complete combustion, an adequate supply of air is required for the burner. Commonly, such air is supplied to the burner by auxiliary fan apparatus costing several hundred dollars. The primary dryer fan provides the air to be heated for drying the crops and the auxiliary fan provides the air for the burner.

While conventional dryers, as described, perform satisfactorily, they are expensive. The capital outlay required is often higher than many farmers are willing to pay.

A main object of this invention is to provide a crop dryer of the character described which is of lower cost than similar dryers of prior design.

Another object of this invention is to provide heating apparatus wherein one fan performs two functions, namely, to project a stream of air to be heated and to provide air for combustion in the burner.

Another object of this invention is to provide heating apparatus wherein the means which supports the burner in the heating chamber also provides the means for directing part of an air stream to the burner.

A further object of this invention is to provide heating apparatus in which air travels in a spiral direction through a cylindrical chamber, air scoop means being provided which is located in proper relation to the spiral travel of the air and directing the air to a reservoir chamber from which the air is fed to the burner.

A still further object of this invention is to provide a crop dryer which is of simple and inexpensive design enabling it to be manufactured and sold as a complete heating unit at low cost.

Other objects of this invention will be apparent hereinafter from the specification and from the recital in the appended claims.

In the drawing:

FIG. 1 is a longitudinal, vertical section through a dryer constructed according to this invention and taken generally on the line 1—1 of FIG. 2 looking in the direction of the arrows;

FIG. 2 is transverse vertical section taken on the line 2—2 of FIG. 1 looking in the direction of the arrows; and FIG. 3 is a horizontal section taken generally along the line 3—3 of FIG. 1 looking in the direction of the arrows.

Referring now to the drawing by numerals of reference, 10 denotes a cylindrical tubular chamber open at both axial ends and providing an air inlet at 11 and an air outlet at 12. Coaxially mounted in chamber 10 is a heat exchanger 14 having radially extending axial fins 15 extending into a passage 16 around the periphery of the heat exchanger and over which air may pass. The heat exchanger comprises a body 18 closed at 19 adjacent outlet 12 and having an inlet funnel 20 toward inlet 11. Funnel 20 terminates in a cylindrical sleeve 21 closed by plate 22. The top of container 10 has a stack 24 which communicates with the inside of heat exchanger 14 and provides for the exhaust of gases.

Mounted on end plate 22 and projecting coaxially into sleeve 21 of the heat exchanger is a burner 25 having a fuel inlet line 26 and an atomizing nozzle 27. The burner has a casing 28 with an opening 29 through which nozzle 27 projects a flame into the body of heat exchanger 14.

Burner 25 and the axial end of the heat exchanger adjacent inlet 11 are supported coaxially in chamber 10 by three radially extending legs 30, 31 and 32, angularly spaced from each other as shown best in FIG. 2. Each of these legs is U-shaped in cross section with the opened portion of the U facing toward inlet 11 and providing radially extending air scoops 34, 35 and 36. Surrounding sleeve 21 is a ring 38 which with the sleeve forms an annular air reservoir or space 39. Each air scoop communicates with reservoir 39 through an air inlet 33, and sleeve 21 has angularly spaced openings 40 through which air is fed to the burner 25.

Fastened to chamber 10 adjacent inlet 11 is a cylindrical housing 41 coaxial with the chamber 10 and fixedly connected to the abutting end of the chamber. Housing 41 has a fan 42 driven by a motor 44. The axial end of housing 41 away from chamber 10 is provided with an air inlet screen 45 to filter the air passing into the apparatus.

When fan 42 is operating, it sucks air into the device through screen 45 and forces it axially into chamber 10. Fan 42 causes the air to travel in a spiral direction indicated by the dotted arrow circle 46 in FIG. 2. A portion of the air stream directed into chamber 10 comes into engagement with the radially extending supports 30, 31 and 32. Angularly extending radially located baffles 48 are disposed to intercept the spiral stream of air and direct it into the air scoops 34, 35 and 36. There is one baffle for each radial support leg and scoop, along the side away from the spiral direction of travel of the air stream. A portion of the air stream engages baffles 48 and is directed as indicated by the arrows 50. The air is directed radially inwardly through the respective air scoops to the annular air reservoir 39. From there the air passes through the inlets 40 of sleeve 21 and through radial air inlet holes 52 in burner casing 28. The air thus provided insures complete combustion of the fuel without wastage.

In the structure described, fan 42 provides the air stream which is to be heated and provide the crop drying. Fan 42 also provides the supplementary air for the burner 25. A single fan therefore performs two functions. The air scoop design picks up the air and directs it to reservoir 39 which produces a desired air distribution and inlet of air around the periphery of the burner.

While this invention has been described in connection with a particular embodiment thereof, it will be understood that it is capable of modification. For example, the crop dryer is shown in connection with a heat exchanger. If desired, the exchanger can be eliminated and the air blown directly through the dryer chamber. This application is intended to cover any variations, uses or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Heating apparatus comprising, in combination, an elongated tubular chamber open at both ends, a burner generally coaxially located within said chamber adjacent one end thereof, means forming an annular air reservoir around said burner, a plurality of legs extending radially between said burner and said chamber to support the burner, a fan mounted and operative to blow a spiral stream of air through said chamber, said air entering said chamber through said one end and becoming heated as it passes by said burner, the heated air then traveling through the chamber for discharge through the opposite end, said burner being closed toward said fan and opened in a direction away from the fan and having radial air inlets communicating with said annular air reservoir, each of said legs being U-shaped in cross-section along its raxial extent and opened toward said fan to scoop air from said spiral stream, a baffle projecting from each of said legs toward said fan and extending substantially between said burner and the wall of said chamber and into said air stream to deflect air into said legs, the air scoops formed by said legs communicating with said annular air reservoir to direct air thereto, air for operating said burner being derived from said air reservoir whereby the need for an auxiliary fan to supply air to the burner is obviated.

2. Heating apparatus comprising, in combination, an elongated chamber open at both ends and having a tubular wall, a burner within said chamber adjacent one end thereof, said burner being closed toward said chamber one end and opened toward the opposite end of the chamber, a fan operative to blow air into said chamber through said one end, around said burner and then out of the chamber through said opposite end, said burner having a plurality of radial openings therein, a plurality of legs extending generally radially between said openings and said wall to support said burner, each of said legs being U-shaped in cross-section along its radial extent with an open portion toward said fan to form an air scoop which communicates with said openings, a deflector baffle on each of said legs to deflect air into said air scoop, each of said air scoops having a radially inward portion adjacent said air scoops and a radially outward portion adjacent said tubular wall, said radially inward portion being axially rearward toward said opposite end from said outward portion so that air striking said scoop will be directed radially inward toward said burner.

3. Heating apparatus comprising, in combination, an elongated chamber open at both ends and having a tubular wall, a burner generally coaxially located within said chamber adjacent one end thereof, a plurality of generally radially extending legs for supporting said burner, each leg having one end adjacent said burner and a second end adjacent said chamber wall, a fan mounted and operative to blow a stream of air through said chamber, cool air entering said chamber through said one end and becoming heated as it passes by said burner, the heated air then passing rearwardly through the chamber for discharge through the opposite end, said burner being closed toward said fan and opened in a direction away from the fan, said burner having a radial air inlet for each of said legs, each leg having an air scoop to direct air to its associated burner inlet, said air scoop being U-shaped in cross-section with a bottom portion and two side portions and an open portion facing toward said chamber one end, a deflector baffle projecting from one side portion of the air scoop toward said chamber one end to deflect air into the scoop, said fan blowing air in a spiral stream through said chamber, said deflector baffle and said one side portion being located on the air scoop side downstream of the spiral direction of travel of the air stream and said leg one end being axially spaced rearwardly toward said opposite end from said leg second end so that air striking said scoop will be directed radially inward toward said burner.

References Cited by the Examiner
UNITED STATES PATENTS

| | | | |
|---|---|---|---|
| 2,402,971 | 7/1946 | McCollum | 158—28 |
| 2,620,787 | 12/1952 | Zink | 126—110 |
| 2,684,668 | 7/1954 | Culp et al. | 126—110 |
| 2,966,944 | 1/1961 | Downs | 263—19 X |
| 3,115,130 | 5/1961 | Seymour | 263—19 X |

JAMES W. WESTHAVER, *Primary Examiner.*